(No Model.)
A. SCHANSCHIEFF.
GALVANIC BATTERY.
No. 379,911. Patented Mar. 20, 1888.
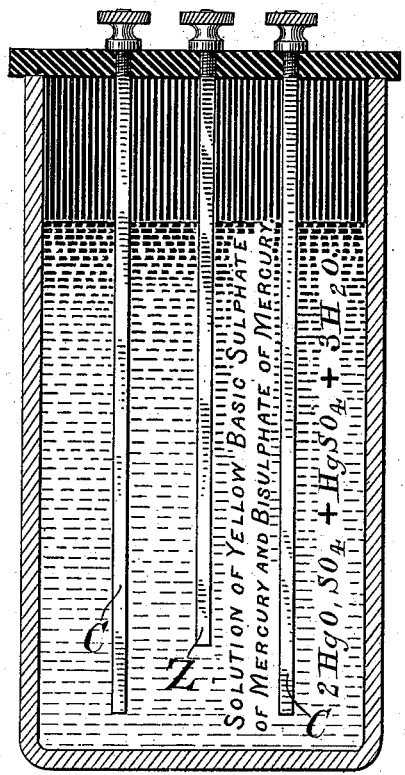
WITNESSES. INVENTOR.

UNITED STATES PATENT OFFICE.

ALEXANDER SCHANSCHIEFF, OF GIPSY HILL, COUNTY OF SURREY, ASSIGNOR TO THE SCHANSCHIEFF ELECTRIC BATTERY SYNDICATE, OF LONDON, ENGLAND.

GALVANIC BATTERY.

SPECIFICATION forming part of Letters Patent No. 379,911, dated March 20, 1888.

Application filed August 9, 1886. Serial No. 210,455. (No model.) Patented in England October 16, 1885, No. 12,378; in Germany December 25, 1885, No. 36,415, and in India October 15, 1886, No. 177.

*To all whom it may concern:*

Be it known that I, ALEXANDER SCHANSCHIEFF, a subject of the Emperor of Russia, and residing at Gipsy Hill, in the county of Surrey, England, electrician, have invented certain new and useful Improvements in Galvanic Batteries, of which the following is a specification.

The invention has already been patented to me in Great Britain October 16, 1885, No. 12,378; in Germany December 25, 1885, No. 36,415, and in India October 15, 1886, No. 177.

In my improved battery I employ a solution of mercury combined with sulphuric acid, the mercury and sulphuric acid being so combined, for instance, that five parts of water may hold in solution one part of metallic mercury, or thereabout.

In another application—a division of this case—No. 239,681, filed May 28, 1887, I have described and claimed such mercurial sulphuric acid compound and its method of manufacture, which is as follows: I add three pounds of sulphuric acid, specific gravity 1.846, to two pounds of metallic mercury. I boil until the metal is converted into mercuric sulphate, and maintain the heat until the excess of acid is evaporated and the salt is dry. When cold, I add one gallon (ten pounds) of water. This dissolves a part only, precipitation of basic sulphate of mercury taking place. I separate the solid residue, and this I then again boil with sulphuric acid, as before, in the proportion of two parts of the residue to three parts of acid. By boiling the residue is dissolved, and by continuing the heat the excess of acid is evaporated. I add the resulting mass, when cold, to the original solution, and again I dissolve as much as the solution will take up, and separate the residue. After three or four repetitions the whole is dissolved in the original gallon of water. The density of the liquid will then be about 1.425 Baumé and the quantity about five quarts. Finally I evaporate the liquid by heat until the electro-salt is deposited in a solid crystalline state. I rake it out as it falls and pack it in closely-stoppered bottles, in which it may be kept for an indefinite time. When liquid is required for use in a battery, I pour one gallon of water on five pounds of the salt. It dissolves perfectly, leaving no residue; or, if there be impurities which render the liquid turbid, it may be filtered through paper. The solution is then ready for use in a battery with zinc and carbon or zinc platinum or platinized tin, copper, or other metal elements.

I can produce the same salt by another process, as follows; but the process which I have already described is preferable: I dissolve metallic mercury in sulphuric acid and evaporate off the excess of acid, as already described. When cold, I dissolve the salt in three times its weight of water. Partial solution only, accompanied by precipitation, takes place. I then add strong sulphuric acid little by little, and finally drop by drop. With constant agitation the solution becomes gradually more and more complete, until finally it is perceived that the drop of sulphuric acid as it falls into the liquid produces a precipitate. The process is then stopped and the solution cooled and filtered. This is then evaporated as already described, and yields in a dry state the novel saline material or electro-salt. The salt thus produced consists of a combination of yellow basic sulphate of mercury (known as "turbeth mineral") with bisulphate of mercury, the formula being $2HgO,SO_4 + HgSO_4 + 3H_2O$. The solution of this salt is of higher specific gravity than any mercurial salt heretofore produced.

The drawing merely shows a battery cup or cell having a central zinc plate, Z, and a carbon plate, C, on each side thereof. Of course any suitable electrodes, however arranged, may be used.

By employing the solution above mentioned a very useful and efficient single fluid-cell is produced. The electro-motive force is high, and it yields a strong and equable current, which can be maintained for hours almost without variation.

The battery is very simple, the only attention required being to fill the cells when the battery is required, and to remove the zinc plates from the cell to economize the liquid when the battery is not in use.

The mercury and residue deposited in the cells during use may be collected and reconverted into liquid to be again used.

I disclaim herein any subject-matter shown and claimed in my application No. 239,681, of May 28, 1887, above referred to.

I claim as my invention—

The combination, with a galvanic-battery cell and electrodes, of an exciting-fluid consisting of a compound of yellow basic sulphate of mercury and bisulphate of mercury, having substantially the formula specified, dissolved in water.

ALEXANDER SCHANSCHIEFF.

Witnesses:
JNO. DEAN,
WALTER J. SKERTEN,
 Both of 17 Gracechurch Street, London.